Jan. 30, 1962 W. E. WERTS 3,018,622
CONTROL APPARATUS
Filed July 11, 1958 4 Sheets-Sheet 1

INVENTOR.
WAYNE E. WERTS
BY Cecil F Arens
ATTORNEY

Jan. 30, 1962 W. E. WERTS 3,018,622
CONTROL APPARATUS
Filed July 11, 1958 4 Sheets-Sheet 2

INVENTOR.
WAYNE E. WERTS
BY Cecil F. Arens
ATTORNEY

INVENTOR.
WAYNE E. WERTS
BY Cecil J Arens
ATTORNEY

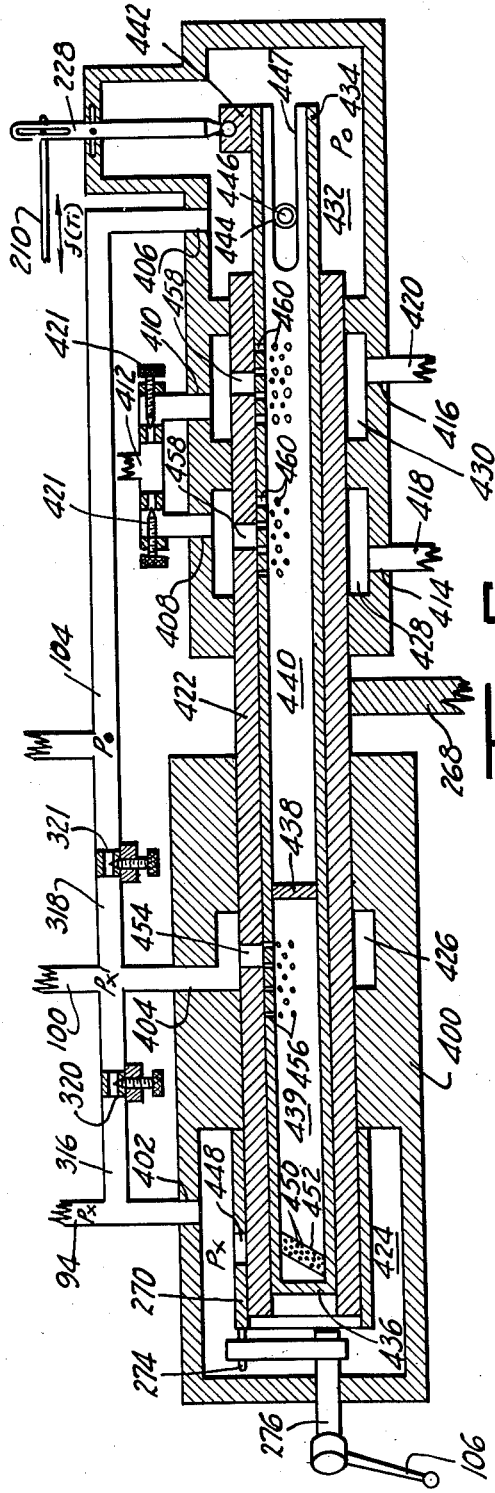
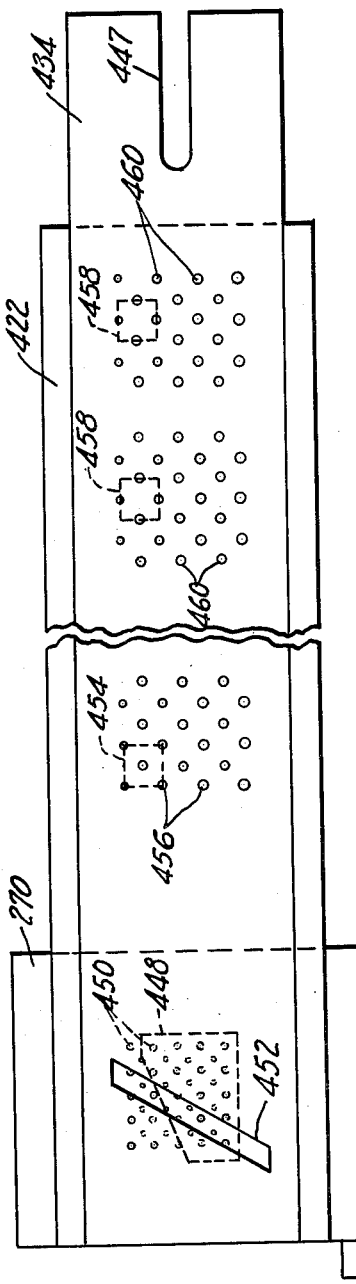

United States Patent Office 3,018,622
Patented Jan. 30, 1962

3,018,622
CONTROL APPARATUS
Wayne E. Werts, South Bend, Ind., assignor to The Bendix Corporation, a corporation of Delaware
Filed July 11, 1958, Ser. No. 748,043
6 Claims. (Cl. 60—39.28)

This invention relates to fluid control apparatus in general and more specifically, but not limited for use thereto, to fuel control apparatus for an aircraft turbo-jet engine.

Most jet engines are provided with fuel control apparatus which operates to control the flow of fuel to the engine in accordance with a plurality of variable conditions of operation. The conventional fuel control requires mechanism which senses variable conditions of operation and includes apparatus responsive to the sensed condition. Depending upon the function to be performed, the latter mentioned apparatus may include cam members, follower members and associated levers, all of which tend to make the fuel control a bulky and weighty piece of equipment which in most cases must be packaged as a unit which, in turn, requires a relatively large space adjacent the engine where it is disposed. Furthermore, in a control system of the cam operated type a serious disadvantage exists as a result of limitations imposed on the control functions by the rate of rise and total rise of the cams both of which are dependent upon the size of the particular cams used. Since it is desirable to keep the fuel control as small as possible due to space limitations on the engine, the cams must, therefore, be held to relatively small dimensions which, in turn, reduce the working range of the cams. It is, therefore, an object of this invention to provide fuel control apparatus which operates in response to a plurality of variable conditions of operation without the need for cam members and the like.

It is another object of this invention to provide fluid control apparatus which is light in weight and which requires a minimum of space in the environment in which it operates.

Another object of this invention is to provide a multisection servo pressure control valve, the individual sections of which are each movable relative to the other sections and positioned relative to the other sections as a function of a different variable condition of operation such that the servo pressure is varied instantaneously and accurately in response to variations in one or more of the variable conditions of operation.

It is a further object of this invention to provide an integrated fluid control system, the individual components of which may be positioned relative to one another as desired and interconnected by fluid couplings.

It is a still further object of this invention to provide fluid control apparatus for controlling a fluid pressure as a function of one or more variable conditions of operation.

It is an important object of this invention to provide improved fuel control apparatus for a combustion engine.

Additional objects and advantages of this invention will become apparent to those skilled in the art in view of the following description taken in conjunction with the drawings.

FIGURE 6 is a sectional view of a modified form of the fluid pressure computer of FIGURE 1;

FIGURE 7 is a developed view of the valve apparatus of FIGURE 6 showing the relative positions and shapes of the ports therein.

Figure 1:
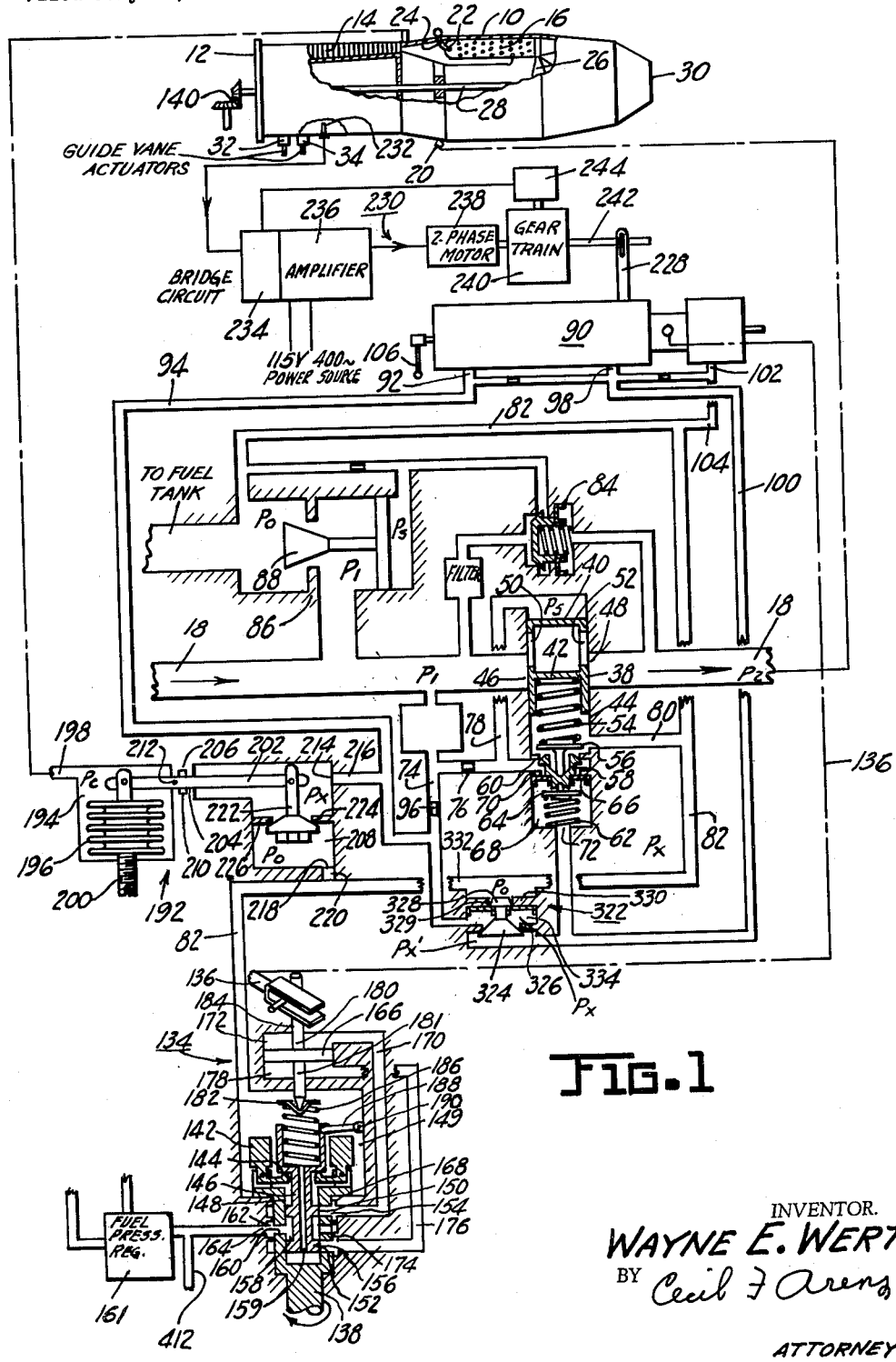
FIGURE 1 is a diagrammatic representation of a gas turbine engine and the fuel system therefor.

Referring to FIGURE 1 of the drawings, numeral 10 designates a gas turbine engine having an inlet 12 through which air flows to a compressor 14 where it is compressed and discharged to combustion chambers 16. Fuel is fed through main supply conduit 18, fuel manifold 20 and fuel nozzles 22 connected to fuel manifold 20 via individual fuel lines 24 to the combustion chambers 16 where the fuel mixes with the compressed air. The mixture of air and fuel is ignited and burned to produce hot motive gases which emanate from the combustion chambers for driving turbine 26 which is drivably connected to compressor 14 via a driveshaft 28. The gases exhaust from the turbine 26 and pass through exhaust nozzle 30 to atmosphere thereby generating thrust to propel the engine. The inlet 12 is provided with two sets of air flow guide vanes, not shown, which function is a well-known manner to control the flow of air through the inlet 12 to the compressor 14. The two sets of guide vanes are positioned by separately operating hydraulically operated motor means 32 and 34 of conventional design and operation through conventional linkage mechanism, not shown.

The effective flow area of main supply conduit 18 and thus fuel flow to the engine is regulated by a hollow cylindrical metering valve 38 the opposite end portions of which are closed by walls 40 and 42. The valve 38 is slidably carried in a bore 44 having an inlet port 46 and and outlet port 48 in series flow with main supply conduit 18. Intermediate the walls 40 and 42, the valve 38 is provided with an inlet port 50 and an outlet port 52 which slidably register with inlet and outlet ports 46 and 48, respectively, to vary the flow area thereof depending upon the position of the metering valve 38. The metering valve 38 is urged toward a closed position by a spring 54 interposed between wall 42 and a spring retainer 56 which bears against a servo valve member 58 which in turn is urged toward a closed position against a valve seat 60 by a spring 62 interposed between the end wall of bore 44 and a spring retainer 64. The valve member 58 is securely attached by conventional means to the center portion of a flexible diaphragm 66 one side of which is exposed to a control fuel pressure $P_x'$ in a chamber 68. The diaphragm is limited in upward movement by a shoulder 70. During engine operation, the valve 38 is variably positioned in response to the control fuel pressure $P_x'$ fed to chamber 68 through a port 72 which actuates the diaphragm operated valve member 58 to regulate a servo pressure $P_s$ supplied to bore 44 via a passage 74 connected to conduit 18 upstream of metering valve 38, a restricted passage 76 and a passage 78. The servo pressure $P_s$ acts against wall 40 in opposition to the force of spring 62 and is adjusted to the value required to balance the spring force by the valve member 58 which controls the amount of fuel that bleeds from passage 76 through valve seat 60, bore 44 and a passage 80 to a drain passage 82 at pressure $P_o$. The $P_1-P_2$ pressure differential across valve 38 is maintained at a predetermined constant value by a constant head unit 84 and servo operated fuel by-pass unit 86 which are substantially the same in structure and operation as the constant head unit and by-pass valve unit shown and fully described in copending application No. 706,194, filed December 30, 1957, in the name of Wayne E. Werts and assigned to the present assignee. In short, the constand head units 84 responds to the $P_1-P_2$ pressure differential across metering valve 38 and adjusts the servo pressure $P_s$ which actuates a by-pass valve 88 in the by-pass unit 86 to thereby maintain the fuel pressure $P_1$ in supply conduit 18 at the required level in accordance with the predetermined constant $P_1 - P_2$ pressure differential.

The control fuel pressure $P_x'$ in chamber 68 is controlled as a function of a plurality of engine operating variables by the fluid pressure computer generally shown at numeral 90 to maintain fuel flow to the engine within desired limits over the operating range of the engine. The fluid pressure computer 90 includes an inlet 92 which receives fuel at pressure $P_x$ via passage 94 connected to passage 74 downstream from a restriction 96, an outlet port 98 which discharges fuel at pressure $P_x'$ to chamber 68 via passage 100 connected to port 72 and an outlet port 102 which communicates with drain passage 82 at pressure $P_o$ via passage 104.

The computer 90 contains apparatus connected to and responsive to the position of a throttle lever 106 and to speed responsive apparatus generally shown at 134. The speed responsive apparatus 134 includes a carrier 138 rotated by the engine through a conventional gear and shafting arrangement 140. A pair of speed weights 142 are pivotally mounted on a flanged portion of the carrier 138 and extend into engagement with a shoulder 144 formed on a spool valve 146 slidably carried in a bore 148 in the carrier 138. The weights 142 rotate within a chamber 149 which communicates with drain pressure $P_o$ via the passage 82. The valve 146 is provided with lands 150 and 152 which register with ports 154 and 156, respectively, in carrier 138 and an annulus 158 which is in constant communication with an inlet port 160 in carrier 138. A pressure balance is maintained across valve 146 by means of a passage 159 connected between opposite ends of valve 146. The inlet port 160 communicates with the outlet of a fuel pressure regulator 161 via an annulus 162 and a passage 164 which regulator operates in a conventional manner to maintain a regulated supply of fuel at a constant pressure $P_{rs}$. The ports 154 and 156 communicate with opposite sides of a servo piston 166 via annulus 168, passage 170 and a chamber 172, and annulus 174, passage 176 and chamber 178, respectively. A rod 181 extends from one side of the piston 166 into engagement with a spring retainer 182 and a rod 180 extends from the opposite side of the piston 166 into engagement with linkage means 136 through which the speed signal is transmitted to the computer 90. A spring 186 is interposed between the spring retainer 182 and the valve 146. An arm 188 pivotally mounted at 190 extends into engagement with the valve 146 and prevents rotational movement of the valve while allowing axial movement thereof. An increase in the force of weights 142 causes upward movement of valve 146 whereupon the chambers 172 and 178 are connected to fuel at pressure $P_{rs}$ and drain pressure $P_o$, respectively, and the resulting pressure differential acts to drive piston 166 downward. This sequence is reversed in the case of a decrease in force of weights 142. Thus, in accordance with the output force of speed weights 142 the spool valve 146 is positioned to cause an increase or a decrease in the pressure differential across servo piston 166 such that the load of spring 186 which acts against the spool valve balances the output force of the speed weights and holds the spool valve 146 at a null position.

The $P_x - P_o$ fuel pressure differential across the fluid pressure computer 90 is controlled as a function of compressor discharge pressure $P_c$ by an air-fuel pressure converter 192 which includes a chamber 194 and an evacuated bellows 196 mounted in the chamber. The chamber 194 communicates with engine compressor discharge pressure $P_c$ via passage 198. The evacuated bellows 196 is fixed in position at one end by means of an adjustable mounting screw 200 and the opposite end of the bellows is connected to one end of a lever 202 which extends through an opening 204 in a partition 206 between chamber 194 and a chamber 208. A seal 210 is provided in the opening 204 to prevent leakage between chambers 194 and 208. The lever 202 is rotatably mounted on a pin 212 and is actuated by the bellows 196. The chamber 208 is provided with an inlet port 214 which communicates with passage 94 via a passage 216 and an outlet port 218 which communicates with a passage 220 leading to passage 82 at drain pressure $P_o$. A valve member 222 pivotally connected to the end of lever 202 coacts with a valve seat 224 formed in a wall 226 in chamber 208 to vary the flow of fuel from inlet port 214 to outlet port 218. Thus, as the bellows 196 responds to compressor discharge pressure $P_c$ the valve member 222 is positioned relative to valve seat 224 in accordance with the pressure $P_c$ such that a corresponding $P_x - P_o$ pressure differential is establised across valve seat 224. The $P_x$ pressure is transmitted via passage 94 to the inlet 92 of the fluid pressure computer 70. The computer 90 then functions to modify the pressure $P_x$ as a function of engine speed, throttle lever position, compressor inlet temperature and compressor discharge pressure $P_c$ as will be hereinafter described.

The computer 90 is connected to one end of lever 228 the opposite end of which is connected to the output of a temperature sensing unit 230 which includes a thermocouple 232 responsive to compressor inlet temperature $T_i$ and connected to a bridge circuit 234 where the thermocouple signal is compared with a reference signal. The resultant temperature error signal is transmitted to electronic amplifier 236 which amplifies the error signal which in turn is utilized to rotate a two phase motor 238 in either of two directions depending upon the relative error of the temperature signal. The two phase motor 238 is drivably connected to a gear train 240 which actuates a rod 242 connected to the free end of the lever 228. Feedback apparatus 244 is connected between the bridge circuit 234 and the gear train and functions to cancel out the error signal subsequent to movement of rod 242. For a detailed description of the temperature sensing unit 230 and the operation of the same, reference is made to Patent No. 2,790,120, issued April 23, 1957, to George Ducoff and assigned to the present assignee.

Figure 2:
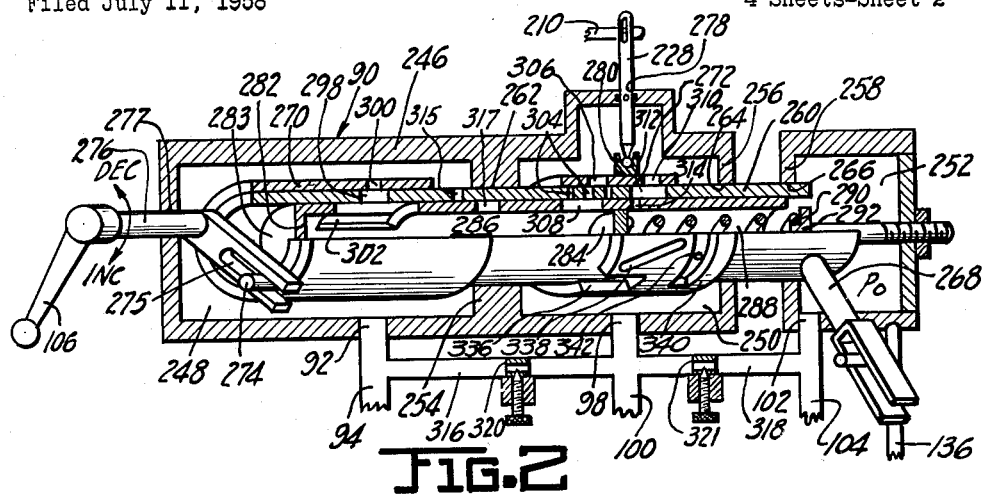
FIGURE 2 is a sectional view shown in perspective of the fluid pressure computer of FIGURE 1.

Now, referring to FIGURE 2, the computer 90 is shown schematically and includes a casing 246, the interior of which is divided into three chambers 248, 250 and 252. The chambers 248 and 250 are separated by a partition 254 and communicate with inlet 92 and outlet port 98, respectively. The chamber 252 is separated from chamber 250 by partitions 256 and 258 and communicates with outlet port 102. A sleeve valve 260 is slidably carried in openings 262, 264 and 266 in partitions 254, 256 and 258, respectively, and extends axially through chamber 250 into chambers 248 and 252. The valve 260 is rotatably actuated by a rod 268 fixedly secured to the sleeve valve 260 between partitions 256 and 258. The rod 268 is connected to and actuated by the linkage means 136. The chambers 248 and 250 contain sleeve valves 270 and 272, respectively, which are concentric with and slidably mounted on the outer surface of valve 260. The valve 270 is rotatably positioned as a function of throttle lever position by means of a rod 274 which is fixedly secured to and extends from the end of the valve 270 into engagement with a slotted arm 275. The slotted arm 275 is attached to the throttle lever 106 via a rod 276 which extends through an opening 277 in casing 246. The valve 272 is axially positioned as a function of a compressor inlet temperature $T_i$ by the lever 228 which extends through an opening 278 in casing 246 into engagement with a projection 280 formed on valve 272. A sleeve valve 282 concentric with and slidably mounted within valve 260 is closed at one end by a wall 283 and open at the opposite end with a wall 284 spaced between the two ends to form chambers 286 and 288. The walls 283 and 284 are exposed to the pressure $P_x$ in chamber 248 and pressure $P_o$ in chamber 252, respectively. The valve 282 is axially positioned as a function of compressor discharge pressure $P_c$ by the $P_x-P_o$ pressure differential which acts in opposition to the force of a spring 290. The spring 290 is interposed between wall 284 and an adjustable spring seat 292 threadedly engaged with casing 246.

The valve 260 is provided with a square port 298 which coacts with a smaller square port 300 in sleeve valve 270 to vary the fuel flow between chambers 248 and 286. A port 302 in valve 282 is arranged in series flow with ports 298 and 300. The axial dimension of port 302 is greater than the axial travel distance of sleeve valve 282 and the circumferential dimension of port 302 is greater than the rotational travel distance of sleeve valve 260 such that unrestricted flow occurs at all times between square port 298 and chamber 286 regardless of the positions of ports 298 and 300 relative to the port 302. The valve 260 is provided with a plurality of spaced circular ports 304 which cooperate with a square port 306 in sleeve valve 272 to vary fuel flow between chambers 286 and 250. A port 308 in valve 282 is arranged in series flow with ports 304 and 306 and is dimensioned in the same manner as port 302 to allow unrestricted flow between chamber 286 and ports 304 at all times regardless of the positions of ports 304 and 306 relative to port 308. At a predetermined maximum allowable value of compressor discharge pressure $P_c$ a corresponding $P_x-P_o$ pressure differential is generated which displaces valve 282 against spring 290 whereupon chamber 250 at control fuel pressure $P_x'$ is communicated with chamber 288 at drain pressure $P_o$ via ports 310, 312 and 314 in valves 272, 260 and 282, respectively. The port 312 is dimensioned in accordance with the range of travel of valve 272 and valve 260 such that port 310 is encompassed by port 312 at all times irrespective of the positions of valves 272 and 260 relative to one another. Therefore, communication between chambers 250 and 288 is controlled by port 314 only which registers with port 312 at a predetermined position of valve 282 as the valve 282 is axially displaced against spring 290 in response to increasing compressor discharge pressure $P_c$.

During engine idle operation, the fuel flow to the engine is compensated for altitude by ports 315 and 317 in valves 262 and 282, respectively. As valve 282 moves toward the left in response to a decreasing $P_x-P_o$ differential in accordance with decreasing compressor discharge pressure $P_c$, the port 317 registers with port 315 and communicates chamber 248 with chamber 286 whereupon the fuel flow through port 306 increases and control fuel pressure $P_x'$ increases correspondingly.

The passage 100 communicates with passages 94 and 104 via passages 316 and 318, respectively. The passages 316 and 318 contain adjustable restrictions 320 and 321, respectively, which may be adjusted to compensate for leakage in the system and for calibration purposes as will be described hereinafter.

Figure 3:
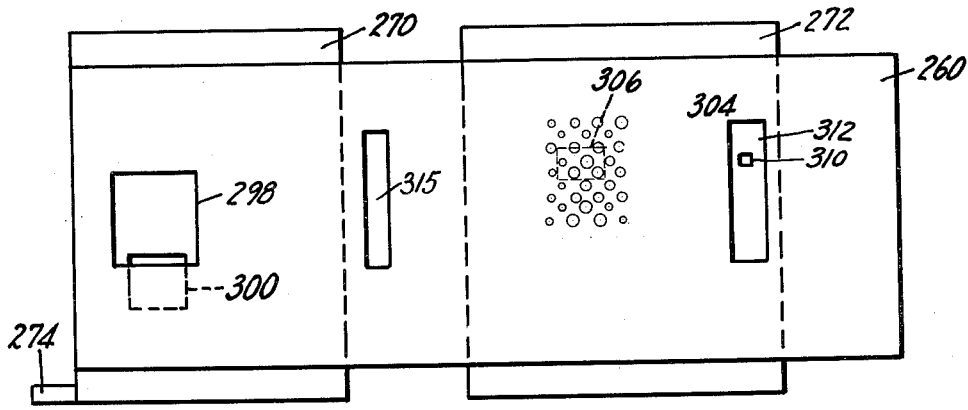
FIGURE 3 is a developed view of a portion of the fluid pressure computer of FIGURE 2 showing the relative positions of the ports in the valve apparatus.

FIGURE 3 is a developed view, looking from the interior of valve 260 of the valve 260 superimposed on the valves 270 and 272. The ports 304 in valve 260 are arranged in horizontal and vertical rows on equally spaced centers. The ports 304 may or may not vary in diameter from one port to the next in any given direction depending upon the manner in which the control fuel pressure $P_x'$ and thus the fuel flow schedule to the engine is to be varied. The square port 306 in valve 272 has sides equal in length to the center to center distance between adjacent ports 304 in either a horizontal or vertical row. The square port 306 is shown in a position whereby it encompasses one full port 304 and each of its corners is positioned at the center of a different port 304. The ports 304 in any given vertical row vary in diameter as a function of engine speed with the smallest port which corresponds to the low end of the speed range being at the top of the row and the largest port which corresponds to the top end of the speed range being at the bottom of the row. The remaining ports in the row increase or decrease in diameter in accordance with increasing engine speed depending upon the fuel requirements of the particular engine.

The ports 304 in any given horizontal row vary in diameter as a function of compressor inlet temperature $T_i$ from right to left in accordance with increasing temperature. Therefore, the effective flow area of port 306 and thus control fuel pressure $P_x'$ will vary as a function of compressor inlet temperature $T_i$ and/or engine speed. The control fuel pressure $P_x'$ will, in turn, determine the position of the metering valve 38 and thus the fuel flow to the engine in accordance with existing inlet temperature and/or speed of the engine.

OPERATION OF FIGURE 1

Figure 4:
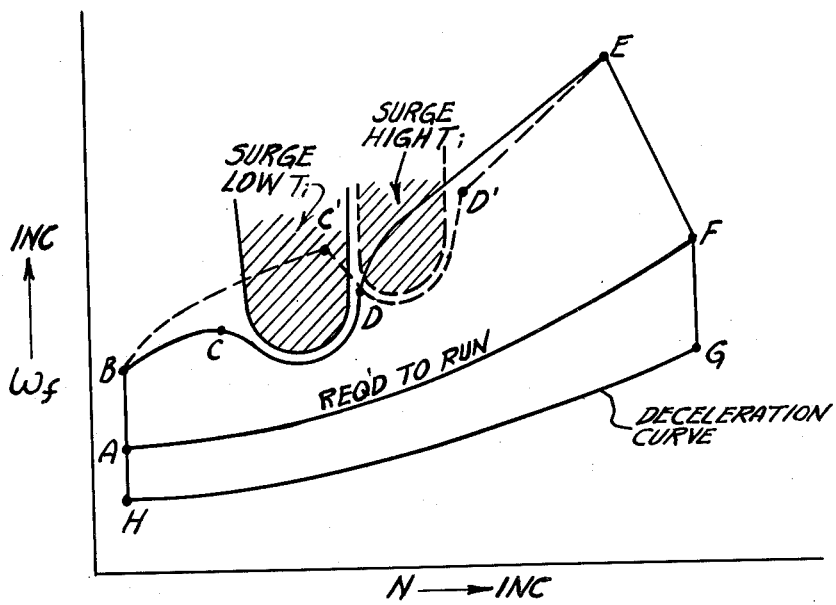
FIGURES 4 and 5 illustrate a series of curves having a fuel flow ($W_f$) versus engine speed (N) relationship.

At the outset, it is to be assumed that the engine is operating at point A on the required to run curve of FIGURE 4 under a fixed set of operating conditions in response to which fuel flow and speed are held at corresponding constant values.

Now, assuming a request for an engine acceleration to maximum speed, the throttle lever 106 is rotated clockwise, looking from the left-hand side of FIGURE 2, to a predetermined position. The valve 270 is similarly rotated and port 300 is positioned within the perimeter of port 298 thereby establishing a maximum flow area between chambers 248 and 286 which in turn causes an increase in control fuel pressure $P_x'$. The control fuel pressure $P_x'$ acts against diaphragm 66 driving valve member 58 upward toward valve seat 60 which results in an increase in the pressure $P_s$ in bore 44. The metering valve 38 responds to the pressure $P_s$ and moves downward against the force of spring 62 whereupon the effective flow area of ports 50 and 52 is increased and a correspondingly greater amount of fuel is delivered to the engine. The drop in the $P_1-P_2$ pressure differential across metering valve 38 is sensed by the constant head unit 84 which functions to decrease the pressure $P_s$ supplied to the by-pass valve unit 86 whereupon the by-pass valve 88 is actuated toward a closed position to effect an increase in fuel pressure $P_1$ upstream of the metering valve 38. When the predetermined constant pressure differential $P_1-P_2$ is re-established across the metering valve 38 the constant head unit 84 and by-pass valve 88 are stabilized in position. In FIGURE 4, the curve from point A on the required to run curve to point B on the acceleration curve illustrates the initial fuel flow increase which occurs subsequent to the increase in flow area of ports 50 and 52. At point B, inertia of the engine has been overcome and the engine begins to accelerate along the maximum acceleration curve. The compressor discharge pressure $P_c$ increases with increasing engine speed and acts upon bellows 196 which in turn contracts and unbalances valve member 222 in a closing direction whereupon a correspondingly higher $P_x-P_o$ pressure differential is established.

At this time, port 300 in valve 270 represents a relatively large flow area as compared to the flow area of port 306 in valve 272 and substantially all of the $P_x-P_x'$ pressure drop between chambers 248 and 250 will occur across port 306. As the engine speed increases, the speed weights 142 rotate faster and function to drive the spool valve 146 upward against the spring 186. The lands 150 and 152 communicate ports 154 and 156 with annulus 158 at $P_{rs}$ pressure and bore 148 at $P_o$ pressure, respectively. The subsequent increase in pressure differential between chambers 172 and 178 acts to drive piston 166 downward against spring 186 which in turn moves the spool valve 152 downward against the force of speed weights 142. When the force of spring 186 and the force of speed weights 142 balance out, the spool valve 152 attains a null position whereby lands 150 and 152 coact with ports 154 and 156, respectively, to maintain the pressure differential across piston 166 at the required value. The linkage means 136 follows the movement of piston 166 and rotates valve 262 in a counterclockwise direction looking from the right-hand side of FIGURE 2.

Assuming a constant relatively low compressor inlet temperature $T_1$, the valve 272 and thus port 306 are fixed in a corresponding position relative to the plurality of ports 304 as shown in FIGURE 3. In this position, the effective flow area of port 306 corresponds to the intercepted area of the ports 304 which lie in three adjacent vertical rows. As the valve 262 is rotated, the ports 304 which lie in the aforementioned three rows move into and out of registry with port 306 such that the effective flow area of port 306 and thus control fuel pressure $P_x'$ varies in accordance with the combined area of the ports 304, which combined area may consist of a portion of each of four ports or the total area of one port plus a portion of the area of four separate ports depending upon the relative positions of port 306 and ports 304. In this manner, the effective flow area of port 306 is increased as the engine accelerates from point B on the curve of FIGURE 4. As the effective flow area of port 306 increases, the fuel pressure $P_x$ is throttled to a lesser degree which in turn results in a corresponding increase in control fuel pressure $P_x'$. This increase in control fuel pressure $P_x'$ is transmitted to chamber 68 where it acts against diaphragm 66 to cause a progressive closing of valve member 58 and a subsequent rise in pressure $P_s$ which results in an increase in the effective flow area of ports 50 and 52 and a corresponding increase in fuel flow to the engine. In response to the fuel flow increase, the engine accelerates from point B to point C on the curve of FIGURE 4.

In the speed range from point C to point D on the curve, the fuel flow to the engine must be decreased as a result of a compressor phenomenon peculiar to axial flow compressors which phenomenon is commonly known to those skilled in the art as compressor stall or surge. When compressor stall or surge occurs, the air pressures and temperatures within the engine may exceed design limitations thereby exposing the engine to serious structural damage which may result in destruction of the engine and the aircraft powered thereby. The compressor surge zone shown in FIGURE 4 illustrates the serious limitation on the amount of fuel which an engine can tolerate if the surge zone is to be avoided and the manner in which the surge zone shifts with changes in compressor inlet temperature $T_1$. As engine speed increases from point C to point D, the valve 260 rotates bringing progressively smaller ports 304 into registry with port 306 whereupon the effective flow area of port 306 and thus the control fuel pressure $P_x'$ decreases accordingly until the lowest point on the curve from C to D is reached, after which point the ports 304 that register with port 306 become progressively larger causing an increase in the effective flow area of port 306 which in turn causes an increase in control fuel pressure $P_x'$. In response to this variation in control fuel pressure $P_x'$, the metering valve 38 is first controlled in a closing direction and then in an opening direction such that the fuel flow to the engine varies along the curved line between points C and D. As engine speed increases beyond point D, the effective flow area of port 306 increases as progressively larger ports 304 move into registry with port 306 which action results in an increasing control fuel pressure $P_x'$ and a correspondingly greater rate of fuel flow to the engine. Engine acceleration progresses along the curve from point D to point E, point E representing the governor break point. Upon reaching point E, engine speed has caused valve 260 to rotate to a position whereby the trailing edge of port 298 overlaps the port 300 to such an extent that the effective flow area of port 300 is relatively small compared to the total area of said port but relatively large in comparison to the effective flow area of port 306. As engine speed increases beyond point E, the rotation of valve 260 causes a further reduction in the effective flow area of port 300, the rate of change of area of port 300 now being greater than the rate of change of area of port 306. Consequently, as engine speed increases from point E to point F, point F being the selected speed point on the required to run curve, the control fuel pressure $P_x'$ decreases in accordance with the rate of decrease of area of port 300 such that the fuel flow to the engine is decreased along the line from point E to point F. At point F, the effective flow area of port 300 is reduced to a predetermined value whereby the control fuel pressure $P_x'$ and thus fuel flow is governed at a constant value in accordance with the selected maximum speed at point F.

At the maximum speed point F the relatively high compressor discharge pressure $P_c$ generated by the compressor may, as a result of climatic conditions, exceed the maximum pressure for which the engine is designed for safe operation. The compressor discharge pressure $P_c$ is maintained below a predetermined maximum allowable value by the action of valve 282 which moves toward the right against spring 290 in response to the increasing $P_x - P_o$ pressure differential established by the compressor discharge pressure $P_c$. If the compressor discharge pressure $P_c$ exceeds the maximum allowable value, the port 314 in valve 282 will move into registry with port 312 in valve 262 whereupon fuel will escape from chamber 250 to chamber 288 at drain pressure $P_o$ causing a drop in control fuel pressure $P_x'$ which in turn results in a decrease in fuel flow to the engine and a subsequent decrease in engine speed and compressor discharge pressure $P_c$. When the compressor discharge pressure $P_c$ has fallen below the maximum allowable value, the port 314 will have moved out of registry with port 312 thereby disestablishing communication between chambers 250 and 288.

To decelerate the engine from point F back to point A on the required to run curve, the throttle lever 106 is rotated counterclockwise which in turn rotates valve 270 such that port 300 moves out of registry with port 298 to interrupt communication between chambers 248 and 286. The control fuel pressure $P_x'$ subsequently falls to a minimum and the metering valve 38 is displaced toward a closed position whereupon fuel flow to the engine decreases to point G on the deceleration fuel flow curve and the engine begins to decelerate. The metering valve 38 is restricted from closing by the action of a minimum fuel flow regulator 322 (see FIGURE 1) which functions to maintain the control fuel pressure $P_x'$ above a predetermined minimum value during engine decelerations to avoid combustion chamber flame-out. The minimum fuel flow regulator 322 includes a poppet type valve 324 which cooperates with an orifice 326 to control communication between the passage 74 at pressure $P_x$ and the passage 100 at pressure $P_x'$. The valve 324 is fixedly secured to a piston 328 which is slidable in an opening 329 in a wall 330 which wall 330 separates two chambers 332 and 334. The chamber 332 is connected to passage 82 at pressure $P_o$ and the chamber 334 is connected to passage 74 at pressure $P_x$. The valve 324 is urged toward a closed position by the fuel pressure $P_x'$ which acts against one side of the valve 324. The valve 324 is urged toward an open position by the drain fuel pressure $P_o$ in chamber 332 which acts against piston 328 and by the fuel pressure $P_x$ in chamber 334 which acts against the other side of valve 324. The effective areas of valve 324 against which the pressures $P_x$ and $P_x'$ act have a predetermined area ratio with the pressure $P_x'$ acting against the larger effective area. Thus, the position of the valve 324 is controlled as a function of the ratio of pressures $P_x$, $P_x'$ and $P_o$ and is normally held closed by the pressure $P_x'$ which overcomes the pressures $P_x$ and $P_o$ acting in opposition thereto.

During an engine deceleration when the control fuel pressure $P_x'$ is below a predetermined value, relative to the $P_x$ pressure, the valve 324 is unbalanced in an opening direction such that fuel at pressure $P_x$ flows from chamber 334 to passage 100. The control fuel pressure $P_x'$ subsequently rises until it is sufficient to overcome the force holding valve 324 open whereupon the valve 324 is stabilized in position such that the ratio of pressures $P_x'$ and $P_x$ is maintained at a predetermined minimum value. Of course, as the engine decelerates the valve 260 will rotate in the aforementioned follow-up manner and port 298 will again register with port 300 at which time communication will be established between chambers 248 and 250. The control fuel pressure $P_x'$ will increase accordingly and the valve 324 will be unbalanced in a closing direction. Upon reaching point H on the deceleration curve, the port 298 has encountered port 300 and the control fuel pressure $P_x'$ increases causing the metering valve 38 to open to the extent that fuel flow increases to point A on the required to run curve. At point A, the engine is operating at the requested idle speed and the valve 260 is stabilized in position. Consequently, fuel flow is stabilized at point A and the engine operates at a steady idle speed.

Figure 5:
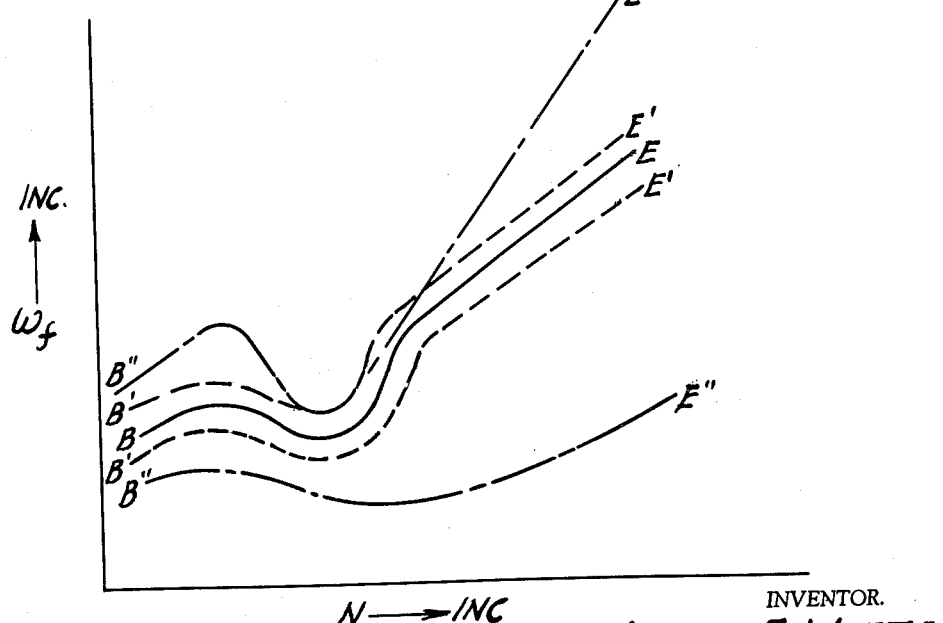

The relative position of the compressor surge area is shown in FIGURE 5 for a relatively high and a relatively low compressor inlet temperature $T_i$. Under a condition of relatively high compressor inlet temperature $T_i$, the aforementioned engine acceleration fuel schedule from point A to point F would be modified as shown by the dashed acceleration line to avoid the surge area shown in dashed outline. To this end, the temperature sensing unit 260 responds to the compressor inlet temperature $T_1$ signal and functions to actuate the lever 228 in a counterclockwise direction which in turn actuates the valve 272 toward the right with respect to valve 262. The port 306 moves into alignment with a different series of ports 304 which are dimensioned in accordance with the relatively high compressor inlet temperature $T_i$. As the engine accelerates, the valve 262 rotates in the aforementioned manner causing the effective flow area of port 306 to vary as a function of speed such that the fuel flow to the engine is scheduled along the dashed acceleration curve in accordance with the displaced surge area.

FIGURE 6

Referring to FIGURE 6, a modified form of the fluid pressure computer 90 is shown wherein parts similar to those of FIGURE 2 are designated by like numerals. A casing 400 is provided with an inlet port 402 which communicates with passage 94 and outlet ports 404 and 406 which communicate with passages 100 and 104, respectively. Also provided in the casing 400 are inlet ports 408 and 410 which communicate with passage 164 at servo pressure $P_{rs}$ via a bifurcated passage 412 and outlet ports 414 and 416 which communicate with the hydraulically operated motor means 32 and 34 via passages 418 and 420, respectively. Each of the bifurcations in the passage 412 contain an adjustable restriction 421 which may be adjusted to vary the rate of fluid flow through the bifurcations to inlet ports 408 and 410. A sleeve valve 422 connected to the rod 268 is rotatably carried in casing 400 and together with casing 400 forms chambers 424, 426, 428, 430 and 432. The inlet port 402 communicates with chamber 424 and the outlet ports 404 and 406 communicate with chambers 426 and 432, respectively. The inlet and outlet ports 408 and 414 communicate with chamber 428 and the inlet and outlet ports 410 and 416 communicate with chamber 430. The throttle lever actuated sleeve valve 270 is concentric with and slidably carried on the outer surface of the valve 422 and a sleeve valve 434 is concentric with and slidably carried on the inner surface of the valve 422. The valve 434 is closed at one end by a wall 436 and is open at the opposite end. A wall 438 spaced between the ends of sleeve valve 434 serves to divide the sleeve valve 434 into two chambers 439 and 440. The valve 434 is actuated axially as a function of inlet temperature $T_1$ by the rod 228 which is pivotally engaged with a projection 442 formed on sleeve valve 434. The valve 434 is prevented from rotating by a roller 444 rotatably carried on a support 446 fixedly secured to casing 400. The roller rides in a slot 447 in valve 434.

The effective flow area between chambers 424 and 439 is controlled as a function of the throttle lever position and engine speed by a port 448 in a sleeve valve 270 and a plurality of circular ports 450 in sleeve valve 422, respectively, and as a function of inlet temperature by a helical port 452 in valve 434 which coacts with the ports 448 and 450. The effective flow area between chambers 439 and 426 is controlled as a function of engine speed and inlet temperature by a square port 454 in valve 422 and a plurality of circular ports 456 in valve 434. The square port 454 and the plurality of circular ports 456 are preferably of the same shape as the ports 306 and 304, respectively, in FIGURE 3 and coact in the manner heretofore described.

The fluid pressure supplied to the hydraulically operated motor means 32 and 34 is modified as a function of engine speed and inlet temperature. To this end, the chambers 428 and 430 which receive fuel at regulated servo pressure $P_{rs}$ are vented to chamber 440 at drain pressure $P_o$ via separate square ports 458 in valve 422 each of which communicate with an associated plurality of circular ports 460 in sleeve valve 434. Each of the square ports 458 and its associated plurality of circular ports 460 cooperate in the manner of the ports 306 and 304 heretofore described.

FIGURE 7 is a developed view looking from the interior of valve 434 of valves 434, 422 and 270 superimposed one upon the other. The port 448 and the plurality of ports 450 cooperate in the manner of the ports 298 and 300 heretofore described to cause an acceleration or deceleration of the engine to a selected speed as well as engine speed governing at the selected speed. The port 448 in valve 270 is polygonal in shape having one side which has a positive slope as shown in the drawing.

The pressures in chambers 428 and 430 which are supplied to motor means 32 and 34, respectively, may or may not vary as the same function of engine speed and inlet temperature depending upon the relative sizes of corresponding ports in the separate plurality of ports 460. Thus, one set of guide vanes controlled by the motor means 32 may be controlled by the pressure in chamber 428 as one function of engine speed and inlet temperature and another set of guide vanes controlled by the motor means 34 may be controlled by the pressure in chamber 430 as a different function of engine speed and inlet temperature.

OPERATION OF FIGURE 6

It is to be assumed that the engine is operating at point A on the required to run curve of FIGURE 4 under the conditions set forth in the operation of FIGURE 2.

To accelerate the engine to maximum speed, the throttle lever 106 is rotated clockwise as in the case of FIGURE 2, whereupon valve 270 is rotated in the same direction causing port 448 to move upward relative to the plurality of ports 450 and port 452 to a position whereby a maximum effective flow area is established. As the engine accelerates along the acceleration curve from A to E, the control fluid pressure $P_x'$ is controlled as a function of speed and inlet temperature by the port 454 and the plurality of circular ports 456 which coact and have the same sequence of operation as the ports 306 and the plurality of ports 304 heretofore described. Upon reaching point E on the acceleration curve the plurality of circular ports 450 has moved relative to port 448 such that the aforementioned governing action takes place and the engine is governed to point F which represents the selected maximum speed.

Referring to FIGURE 7, the port 452 moves from left to right relative to the port 448 as a function of increasing inlet temperature such that the selected maximum speed is biased in accordance with the existing inlet temperature. To this end, an increase in inlet temperature causes counterclockwise movement of lever 228 and corresponding axial movement of valve 434. As the port 452 moves from left to right relative to the positive sloped side of port 448, it will be noted that the effective flow area between chambers 424 and 439 increases. In the present case, this movement results in an increase in effective flow area of port 452 and thus the effective flow area between chambers 424 and 439 such that the control pressure $P_x'$ increases causing a corresponding increase in fuel flow to the engine. Thus, engine speed is biased in an increasing direction as a function of increasing inlet temperature. Upon reaching a predetermined inlet temperature, the port 452 has moved to the extreme right of the sloped portion of the port 448 and further increases in inlet temperature have no effect on the effective flow area of the port 452. It is apparent that the sloped portion of the port 448 may be made negative whereupon engine speed would be biased in a decreasing direction in response to increasing inlet temperature. Also, the port 448 may be provided with positive and negative sloped sides which form a V-shaped portion, not shown, across which the port 452 would move.

With the latter mentioned arrangement, a predetermined engine speed could be chosen above which engine speed could be biased in an increasing direction with increases in inlet temperature as a result of port 452 moving across the positive sloped side of port 448 and below which engine speed could be biased in a decreasing direction in response to increasing inlet temperature as a result of the port 452 moving across the negative sloped side of port 448.

While the port 452 may be formed circumferentially in the valve 434, in which case it would appear vertical in FIGURE 7 rather than helically as shown, the ports 458 and 452 would cooperate in substantially the same manner and engine speed would be biased as a function of inlet temperature in the abovementioned manner. However, by making the port 452 helical as shown in FIGURE 7, maximum engine speed can be biased as one function of inlet temperature, and idle engine speed can be biased as a different function of engine speed. Since the port 448 and the plurality of ports 450 both rotate relative to the port 452 from a position under the upper portions of the port 452 under maximum engine speed conditions to a position under the lower portion of port 452 under idle engine speed conditions, it is apparent that the port 452 will encompass correspondingly different portions of the plurality of ports 450 and port 448 depending upon the angle at which the port 452 cuts across the plurality of ports 450 and port 448.

The acceleration fuel flow curve from B to D may be adjusted to a certain degree by means of the restrictions 320 and 321. The curve from B to E may be raised by increasing the effective area of restriction 320 or may be lowered by decreasing the effective area of restriction 320 without causing any substantial change in the trend of the curve as shown by the dashed curves B'—E' in FIGURE 5. The curve from B to E may be raised or lowered with an accompanying change in the trend of the curve as shown by the alternately dashed and dotted lines B''—E'' in FIGURE 5, by varying the effective area of restriction 321. Decreasing the effective area of the restriction 321 results in upward displacement of the curve and a relatively constant percentage increase in fuel flow with regard to the curve from B to E. Increasing the effective area of the restriction 321 results in downward displacement of the curve and a corresponding relatively constant percentage decrease in fuel flow. Thus, by suitable adjustment of restriction 320 and/or 321 the acceleration fuel flow curve may be varied as desired in accordance with the fuel flow requirements of a given engine.

The porting arrangement in the sleeve valves 260, 270, 272 and 282 is not limited to the arrangement shown in FIGURE 2 but may be varied to suit the requirements of a particular system as desired. For example, in FIGURE 2 there is shown three ports 336, 338 and 340 in valve 272, each of which may be provided to control the fuel pressure $P_x'$ in accordance with a different control function. Each of these ports is arranged to cooperate with a different port in sleeve valve 260 such as the relatively small port 342 encompassed by port 340. With this arrangement, the effective flow area of the relatively small port 342 and thus the control fuel pressure $P_x'$ will vary as a function of compressor inlet temperature $T_1$ only in the case of port 340, as a function of engine speed N only in the case of port 336, and as a function of compressor inlet temperature $T_1$ and engine speed N in the case of port 338.

I claim:

1. In control apparatus operative with a fluid motor which responds to a control fluid pressure to position a movable member, the combination of a conduit for delivering fluid from a source of relatively high pressure fluid to said fluid motor, first, second, third and fourth valve members in said conduit operatively connected to one another for controlling the flow of fluid through said conduit and thus said control fluid pressure, means responsive to a first variable condition of operation operatively connected to said first valve member, said first valve member having an inlet port and being rotatably actuated as a function of said first variable condition of operation, means responsive to a second variable condition of operation operatively connected to said second valve member, said second valve member having an outlet port and being actuated axially as a function of said second variable condition of operation, means responsive to a third variable condition of operation operatively connected to said third valve member, said third valve member having a plurality of inlet ports and outlet ports and being rotatably actuated as a function of said third variable condition of operation, said first valve member inlet port coacting with one of said plurality of inlet ports to form a first variable area inlet restriction and said second valve member outlet port coacting with one of said plurality of outlet ports to form a first variable area outlet restriction, and means responsive to a fourth variable condition of operation operatively connected to said fourth valve member, said fourth valve member having an inlet port which coacts with another of said plurality of inlet ports to form a second variable area inlet restriction and an outlet port which coacts with another of said plurality of outlet ports to form a second variable area outlet restriction and being actuated axially as a function of said fourth variable condition of operation, said first, second, third and fourth valve members being concentrically arranged and movable relative to one another so as to vary the flow area of said first variable area inlet restriction as a function of said first and third variable conditions of operation, vary the flow area of said first outlet restriction as a function of said second and third variable conditions of operation, vary the flow area of said second inlet restriction as a function of said fourth variable condition of operation over a first range of positions of said fourth valve member, and vary the flow area of said second outlet restriction as a function of said fourth variable condition of operation over a second range of positions of said fourth valve member.

2. In a fuel control system for a combustion engine having a burner and a control lever for controlling the operation of the engine, a source of fuel, a fuel conduit for delivering fuel from said source to said burner, a valve in said conduit for controlling the fuel flow therethrough to said burner, and servo mechanism responsive to a control fluid pressure operatively connected to said valve for controlling the operation thereof, the combination of means for controlling said control fluid pressure including a conduit connected between a source of relatively high fluid pressure and said servo mechanism, a first valve member in said conduit, said first valve member being connected to said control lever and actuated as a function of control lever position, a second valve member in said conduit, means responsive to a temperature in said engine operatively connected to said second valve member for controlling the operation thereof, a third valve member in said conduit concentrically arranged with said first and second valve members, means responsive to engine speed operatively connected to said third valve member for controlling the operation thereof, a fourth valve member in said conduit concentrically arranged with said third valve member, means responsive to a fluid pressure in said engine which varies with engine power output operatively connected to said fourth valve member for controlling the operation thereof, said first and third valve members having first and second valve ports, respectively, movable relative to one another to form a first variable area restriction so as to vary the effective flow area of said conduit as a function of control lever position and engine speed, said second and third valve members having third and fourth valve ports, respectively movable relative to one another to form a second variable area restriction so as to vary the effective flow of said conduit as a function of temperature and engine speed, said third and fourth valve members having fifth and sixth valve ports, respectively, movable relative to one another so as to vary the effective flow area of said conduit as a function of said fluid pressure.

3. In a fuel feed control system for a combustion engine having a burner and a control lever for controlling the operation of the engine, a source of fuel, a fuel conduit for delivering fuel from said source to said burner, a valve in said fuel conduit for controlling the fuel flow therethrough to said burner, fuel by-pass means operatively connected to said fuel conduit for maintaining a constant predetermined pressure drop across said valve, servo mechanism responsive to a control fluid pressure operatively connected to said valve for controlling the operation thereof, the combination of means for controlling said control fluid pressure including a conduit connected between a source of relatively high fluid pressure and said servo mechanism, a first valve member operatively connected to said conduit for controlling the fluid flow therethrough, means responsive to a fluid pressure which varies with engine power output operatively connected to said first valve member for controlling the operation thereof, a second valve member provided with an inlet port, said second valve member being operatively connected to and actuated as a function of the position of said control lever, a third valve member provided with inlet and outlet ports, means responsive to engine speed operatively connected to said third valve member for controlling the operation thereof, a fourth valve member provided with an outlet port, means responsive to a temperature in said engine operatively connected to said fourth valve member for controlling the operation thereof, said second and third valve members being concentrically arranged and movable relative to one another whereby said second valve member inlet port and said third valve member inlet port coact to vary the effective flow area of said conduit as a function of control lever position and engine speed, said third and fourth valve members being concentrically arranged and movable relative to one another whereby said third valve member outlet port and said fourth valve member outlet port coact to vary the effective flow area of said conduit as a function of engine speed and temperature.

4. Fluid flow control apparatus for regulating a control fluid pressure as a function of a plurality of variable conditions of operation comprising a housing having an inlet and an outlet, a passage connecting said inlet with a source of relatively high fluid pressure, a passage connecting said outlet with a receiver for said control fluid pressure, valve means disposed in said housing for controlling the flow of fluid from said inlet to said outlet, said valve means including a first valve member having an inlet port and a plurality of outlet ports of varying flow areas formed therein in spaced relationship with one another, a second valve member slidably engaged with said first valve member and having a port which registers with and is movable relative to said inlet port, a third valve member slidably engaged with said first valve member and having a port which registers with and is movable relative to said plurality of outlet ports, said plurality of outlet ports being arranged in a pattern whereby said port in said third valve member encompasses a substantially constant number of ports in said plurality of ports irrespective of its position relative to said plurality of outlet ports, control means operatively connected to said first valve member for varying the position of said first valve member relative to said second and third valve members as a function of a first variable condition of operation, control means operatively connected to said second valve member for varying the position of said second valve member as a function of a second variable condition of operation, and control means operatively connected to said third valve member for varying the position of said third valve member as a function of a third variable condition of operation.

5. In a fuel control system for a combustion engine having an air compressor and a burner to which said air compressor delivers and a throttle lever for controlling the operation of the engine, a fuel conduit for delivering fuel from a source to said burner, a fuel metering valve operatively connected to said conduit for controlling the fuel flow therethrough, servo mechanism responsive to a control fuel pressure operatively connected to said fuel metering valve for controlling the operation of said valve, the combination of means defining a conduit connected between said supply conduit and said servo mechanism through which said control fuel pressure is supplied, a branch passage connected between said first named means and a source of drain pressure, a valve member operatively connected to said branch passage for controlling the fuel flow therethrough, pressure responsive means responsive to a compressor air pressure operatively connected to said valve member for controlling the position of said valve member and thus said control fuel pressure as a function of said compressor air pressure, valve means operatively connected to said first named means downstream from said branch passage for varying the effective flow area of said conduit and thus modifying said control fuel pressure as a function of a plurality of engine operating conditions, said valve means including a first movable member having first and second inlet ports in parallel flow relationship and an outlet port in series flow with said first and second inlet ports, speed responsive means being operatively connected to said engine and said first movable member for varying the position of said first movable member as a function of engine speed, a second movable member operatively connected to said first movable member and to said throttle lever for varying the effective flow area of said first inlet port as a function of throttle lever position, temperature responsive means responsive to an engine operating temperature, a third movable member operatively connected to said first movable member and to said temperature responsive means for varying the effective flow area of said outlet port as a function of said engine operating temperature, a fourth movable member responsive to the control fuel pressure established by said valve member operatively connected to said first movable member for varying the effective flow area of said second inlet port as a function of compressor discharge pressure.

6. In a fuel system for a combustion engine having a compressor and a control lever for controlling the operation of the engine, a fuel conduit for supplying fuel from a source to said engine, a restriction in the conduit, a valve member operative with said restriction for controlling the flow of fuel through said fuel conduit to said engine, servo mechanism responsive to a control fluid pressure for controlling the operation of said valve member, the combination of a supply conduit for supplying said control fluid pressure to said servo mechanism, means responsive to compressor discharge pressure for controlling the effective flow area of said supply conduit and thus said control fluid pressure as a function of compressor discharge pressure, first, second, and third valve members in said supply conduit operatively connected to one another for controlling the fluid flow through said supply conduit and thus said control fluid pressure, said first valve member having an inlet port and being rotatably actuated as a function of control lever position, said second valve member having an outlet port and being axially actuated as a function of an engine temperature, said third valve member having an inlet port and an outlet port which coact with said first valve member inlet port and said second valve member outlet port, respectively, to form a variable area inlet restriction and a variable area outlet restriction, said third valve member being rotatably actuated as a function of engine speed, said control fluid pressure varying in accordance with the effective flow area of said inlet and outlet restrictions and being operative to actuate said fuel controlling valve member to thereby regulate the flow of fuel through said fuel conduit in accordance with variations in compressor discharge pressure, control lever position, engine speed and temperature.

References Cited in the file of this patent

UNITED STATES PATENTS

| | | |
|---|---|---|
| 2,089,873 | Benson | Aug. 10, 1937 |
| 2,424,035 | Ifield | July 15, 1947 |
| 2,581,275 | Mock | Jan. 1, 1952 |
| 2,649,686 | Lawrence | Aug. 25, 1953 |
| 2,658,483 | Harris | Nov. 10, 1953 |
| 2,668,414 | Lee | Feb. 9, 1954 |
| 2,686,561 | Isreeli et al | Aug. 17, 1954 |
| 2,689,606 | Mock | Sept. 21, 1954 |
| 2,836,957 | Fox | June 3, 1958 |
| 2,856,754 | Torell | Oct. 21, 1958 |